(12) United States Patent
Piret

(10) Patent No.: US 6,421,806 B1
(45) Date of Patent: Jul. 16, 2002

(54) INFORMATION TRANSFER METHOD AND DEVICE, INFORMATION RECEIVING METHOD AND DEVICE AND NETWORK STATIONS USING THEM

(75) Inventor: Philippe Piret, Cesson-Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/464,074

(22) Filed: Dec. 16, 1999

(30) Foreign Application Priority Data

Dec. 29, 1998 (FR) .............................................. 98 16549

(51) Int. Cl.$^7$ ............................................. H03M 13/15
(52) U.S. Cl. ...................................... 714/777; 714/778
(58) Field of Search .................................. 714/777, 778

(56) References Cited

PUBLICATIONS

Hammons et al., "The Z4 Linearity of Kerdock, Preparata, Goethals, and Related Codes", IEEE Transactions on Information Theory, vol. 40, No. 2, Mar. 1994, pp. 301–319.*
Bonnecaze et al., "Quaternary Quadratic Residue Codes and Unimodular Lattices", IEEE Transactions of Information Theory, vol. 41, No. 2, Mar. 1995, pp. 366–377.*
Calderbank et al., "A 2–Adic Approach to the Analysis of Cyclic Codes", IEEE Transactions on Information Theory, vol. 43, No. 3, 1997, pp. 977–986.*
Calderbank A.R. et al.: "A 2–Adic Approach to the Analysis of Cyclic Codes" IEEE Transactions on Information Theory, vol. 43, No. 3, May 1997 (1997–05), pp. 977–986, New York, USA.
Berlekamp E.R.: "Algebraic Coding Theory", 1984, Aegean Park Press, Laguna Hills, USA XP002115198 22385, pp. 203–205.
Kschischang F.R. et al.: "Block Coset Codes for M–Ary Phase Shift Keying" IEEE Journal of Selected Areas in Communications, vol. 7, No. 6, Aug. 6, 1989, pp. 900–913, XP000048614, New York, USA.

\* cited by examiner

Primary Examiner—Stephen M. Baker
(74) Attorney, Agent, or Firm—Fitzpatrick, Cella, Harper & Scinto

(57) ABSTRACT

The information transfer method uses:
- an alphabet $Z_{2^t} = \{0, 1, 2, \ldots 2^t-1\}$, $t \geq 3$, in which additions and multiplications are carried out modulo $2^t$, and
- a lifted Hamming code whose generator polynomial is in $Z_{2^t}$.

It includes:
- coding (302) of the information by a sequence of words of the said code,
- labelling (303), each letter of the alphabet $Z_{2^t}$ labelling a letter of an alphabet A, for two adjacent symbols of A, one of the labels is the residue modulo $2^t$ of the other incremented by 1,
- for each word of the said code, transmission (305) of signals, a physical quantity of which is proportional to the elements of A labelled by each of the symbols of the words of the said code.

32 Claims, 4 Drawing Sheets

INFORMATION TRANSFER METHOD AND DEVICE, INFORMATION RECEIVING METHOD AND DEVICE AND NETWORK STATIONS USING THEM

The present invention relates to an information transfer device and method, an information receiving device and method and network stations using them.

8-state amplitude modulation (known by the name "8-AM") can be described as follows. In order to transmit information, an alphabet $$A=\{-7, -5, -3, -1, 1, 3, 5, 7\}$$

containing eight numbers, referred to as elementary signals, is available. At each instant r.T, with r=0, 1, 2, ..., a multiple of an elementary duration T, an information source selects a number a from the alphabet A and transmits this number a to a modulator. This modulator produces, between the instants r.T and (r+1).T, the electrical signal a. cos(2.π.f.t) (or, more precisely, a signal of amplitude proportional to a. cos(2.π.f.t)), where t is the time and f is the frequency of the carrier.

A received signal is often modified, for example by noise. This means that the received signal corresponding to a transmitted signal a. cos(2.π.f.t) (a being in the alphabet A) will be measured and evaluated as corresponding to the transmission of b. cos(2.π.f.t), a formula in which b may be different from a and is moreover not necessarily an element of A.

Sometimes, the noise level or modification, during a period T, are sufficiently high to make b. cos(2.π.f.t) closer to a*. cos(2.π.f.t) with a* in A, and a* different from a, than to any other transmittable signal, including a. cos(2.π.f.t). In this case, the decision rule is to estimate that a* was transmitted and an estimation error appears. It can be demonstrated that, with Additive White Gaussian Noise conditions, the probability of such an estimation error depends greatly on the amount $(a-a^*)^2.T$, and, the smaller the said amount, the higher this probability will be.

In particular, the probability of estimating a*=-7 when a=7 was transmitted is very low and the probability of estimating a*=3 when a=1 was transmitted is higher.

Furthermore, it is wished to have easy access to the information while receiving the noisy message. This property is referred to as an easy decoding method.

These same reasonings are found again for other amplitude modulation methods, such as 16-AM modulation (16-state amplitude modulation), for quadrature amplitude modulation methods, such as 64-QAM modulation (64-state quadrature amplitude modulation) and for phase modulation methods such as 8-PSK modulation (8-state phase modulation).

Let, for example, information transmission by means of 8-state amplitude modulated ("8-AM") signals or 64-state quadrature amplitude modulated ("64-QAM") signals be considered.

In the case of 8-AM modulation, the eight possible signals are therefore eight amplitudes proportional to the eight numbers of the alphabet A={-7, -5, -3, -1, 1, 3, 5, 7}, and in the case of 64-QAM modulation, the sixty-four possible signals are the sixty-four amplitude pairs (a, b), where a and b are two amplitudes each being proportional to one of the eight numbers of the alphabet A. A sequence of length n in the 64-QAM modulation alphabet can therefore be viewed as a sequence of length 2n in the 8-AM alphabet and everything which is said concerning coding adapted to 8-AM modulation can therefore easily be adapted to 64-QAM modulation.

When these signals are transmitted on a channel, for example a channel with Additive White Gaussian Noise ("AWGN"), the probability that the received signal is estimated as being equal to $a_2$ when the signal sent is $a_1$ depends, in effect, on the actual values of $a_1$ and $a_2$.

Many methods used in practice do not, however, take these probabilities into account. These are designed to correct a certain number of erroneous received symbols, but their corrective capability is not expressed in terms of total amplitude of the error. In other words, they take into account only the Hamming distance between the received word and the code words, to the detriment of any other distance measurement, like for example the Lee distance.

Of course, efforts are sometimes made to take into account the amplitude of the error in the decoder but most often in the case of soft decoding, which makes the decoding expensive, or in the case of a channel whose input alphabet has at most four letters. On this subject, the article by Hammons, Kumar, Calderbank, Sloane and Solé entitled "The $Z_4$- linearity of Kerdock, Preparata, Goethals and related codes", IEEE Trans. On Inform. Theory, IT-40, pages 301 to 319, published in March 1994, should be consulted.

The present invention is concerned with a method of algebraic decoding of certain codes in the alphabet A, based on a judicious labelling of the elements of this alphabet by the integers 0, 1, ..., 7, using a hard estimation of the received symbols and a notion of distance between words which is close to the Lee distance. On the subject of Hamming and Lee distances, the book by E. Berlekamp "*Algebraic Coding Theory*" published by McGraw-Hill in 1968 should be consulted. Simultaneously, specific coding schemes which produce good codes which can be decoded by this method will be described.

The invention aims to propose a coding method and device and, correlatively, a decoding method and device, which make it possible to recover the transmitted information, in the presence of noise.

An alphabet will be referred to as "numerical" if its symbols are real numbers or complex numbers viewed as pairs of real numbers. In an alphabet of real numbers, two symbols will be referred to as "adjacent" if the alphabet does not contain any other number which is both greater than one of these numbers and less than the other.

To this end, the present invention relates, according to a first aspect, to an information transfer method, characterised in that:

it uses:

an alphabet $Z_{2^t}=\{0, 1, 2, \ldots 2^t-1\}$ having $2^t$ elements, where t is at least equal to 3, and in which additions and multiplications are carried out modulo $2^t$, and a cyclic code, possibly abbreviated, referred to as a "lifted Hamming code" obtained by lifting a binary Hamming code, and whose generator polynomial is the lifting into $Z_{2^t}$ of a generator polynomial of odd degree in $\{0, 1\}$ of such a binary Hamming code; and it includes:

an operation of coding the information by a sequence of words of the said lifted Hamming code, a labelling operation, during which each letter of the alphabet $Z_{2^t}$ is used to label a letter of a numerical alphabet A, so that, for any pair of so-called "adjacent" symbols of A, the label of one of these symbols is the residue modulo $2^t$ of the label of the other incremented by 1, for each word of the said lifted Hamming code, an operation of transmitting signals with amplitudes proportional to the elements of A labelled by each of the symbols of the words of the said lifted Hamming code.

A labelling of the alphabet A satisfying the conditions described above (for any pair of so-called "adjacent" symbols of A, the label of one of these symbols is the residue modulo $2^t$ of the label of the other incremented by 1) is referred to as "favourable". A favourable labelling of a numerical alphabet is easily achieved by applying a principle of consecutiveness, of which here is an application:

| letter of the alphabet A: | −7 | −5 | −3 | −1 | 1 | 3 | 5 | 7 |
|---|---|---|---|---|---|---|---|---|
| label | 2 | 1 | 0 | 7 | 6 | 5 | 4 | 3 |

Correlatively, according to a second aspect, the present invention relates to a method of receiving a sequence of physical quantities representing information, characterised in that:

it uses:
  a numerical alphabet A,
  an alphabet $Z_{2^t}=\{0, 1, 2, \ldots 2^t-1\}$ having $2^t$ elements, where t is at least equal to 3, and in which additions and multiplications are carried out modulo $2^t$, and
  a cyclic code, possibly abbreviated, referred to as a "lifted Hamming code" obtained by lifting a binary Hamming code, and whose generator polynomial is the lifting into $Z_{2^t}$ of a generator polynomial of odd degree in $\{0, 1\}$ of such a binary Hamming code; and it includes:
  an operation of demodulating each received signal into a letter of the alphabet A,
  a labelling operation, during which each letter of the alphabet $Z_{2^t}$ is used to label a letter of the numerical alphabet A, so that, for any pair of so-called "adjacent" symbols of A, the label of one of these symbols is the residue modulo $2^t$ of the label of the other incremented by 1,
  an operation of decoding each sequence of labels, into a sequence of the said lifted Hamming code.

In fact, the inventor has discovered that, for any value of t at least equal to 3, the Lee distance between two different sequences of such a lifted Hamming code is always equal to or greater than 5. Therefore, by virtue of the present invention, at least the errors whose Lee weight is equal to 1 or 2 can be corrected.

According to particular characteristics, the decoding operation includes an error correction operation which includes:
  an operation of verifying that the syndrome is compatible with an error affecting only one element of the sequence of labels,
  in the negative case, an operation of determining couples of positions of erroneous elements compatible with the syndrome, couples the number of which is at most equal to half the length of the lifted Hamming code.

By virtue of these provisions, the number of couples of positions to be considered is greatly reduced.

According to particular characteristics, the decoding operation includes an operation of determining at least one reduced syndrome, the m-tuple $s^{(q)}$ equal to the column m-tuple $s=Hr^T$ referred to as the "syndrome" and reduced modulo the positive integer number q equal to a power of 2, where H is the control matrix of the lifted Hamming code used.

The consideration of these reduced syndromes facilitates the decoding.

According to particular characteristics, in the information receiving method as briefly described above:
  as a preliminary to the decoding operation, an operation is performed of calculating the residue modulo 8, of each element of the syndrome s equal to the product $Hr^T$, modulo $2^t$, where H is the control matrix of the lifted Hamming code used and
  the decoding operation includes the determination of each position of a possibly erroneous element, using the said residue.

By virtue of these provisions, the invention is easily applied to any modulation of the $2^t$-AM or $2^{2t}$-QAM type, with t equal to or greater than 4.

According to a third aspect, the present invention relates to an information transfer device, characterised in that it has:

A/ a processing means adapted:
to use:
  an alphabet $Z_{2^t}=\{0, 1, 2, \ldots 2^t-1\}$ having $2^t$ elements, where t is at least equal to 3, and in which additions and multiplications are carried out modulo $2^t$, and
  a cyclic code, possibly abbreviated, referred to as a "lifted Hamming code" obtained by lifting a binary Hamming code, and whose generator polynomial is the lifting into $Z_{2^t}$ of a generator polynomial of odd degree in $\{0, 1\}$ of such a binary Hamming code; and
to code the information by a sequence of words of the said lifted Hamming code,
to label each letter of the alphabet A by a letter of the alphabet $Z_{2^t}$, so that, for any pair of so-called "adjacent" symbols of A, the label of one of these symbols is the residue modulo $2^t$ of the label of the other incremented by 1, and B/ a transmission means adapted, for each word of the said lifted Hamming code, to transmit signals, a physical quantity of which is proportional to the elements of A labelled by each of the symbols of the words of the said lifted Hamming code.

According to a fourth aspect, the present invention relates to an information receiving device, characterised in that it has:

A/ a signal receiving means adapted to demodulate each received signal in order to produce at least one letter of the alphabet A, B/ a processing means adapted:
to use:
  a numerical alphabet A,
  an alphabet $Z_{2^t}=\{0, 1, 2, \ldots 2^t-1\}$ having $2^t$ elements, where t is at least equal to 3, and in which additions and multiplications are carried out modulo $2^t$, and
  a cyclic code, possibly abbreviated, referred to as a "lifted Hamming code" obtained by lifting a binary Hamming code, and whose generator polynomial is the lifting into $Z_{2^t}$ of a generator polynomial of odd degree in $\{0, 1\}$ of such a binary Hamming code; and
to label each letter of the numerical alphabet A by a letter of the alphabet $Z_{2^t}$, so that, for any pair of so-called "adjacent" symbols of A, the label of one of these symbols is the residue modulo $2^t$ of the label of the other incremented by 1,
to decode each sequence of labels v, into a sequence r of the said lifted Hamming code.

The invention also relates to:
  an information storage means readable by a computer or a microprocessor storing instructions of a computer program, characterised in that it allows the implementation of the method of the invention as briefly described above, and an information storage means which is removable, partially or totally, and readable by a computer or a microprocessor storing instructions of a computer program, characterised in that it allows the implementation of the method of the invention as briefly described above.

The invention also relates to a network station, which has an information transfer device as briefly described above.

The invention also relates to a network station, which has an information receiving device as briefly described above.

Since this information transfer device, this information receiving device, these storage means and these network stations have the same particular characteristics and the same advantages as the information transfer method briefly described above, these particular characteristics and these advantages are not repeated here.

Other advantages, aims and characteristics of the present invention will emerge from the description which follows, produced with reference to the accompanying drawings in which.

Figure 1:
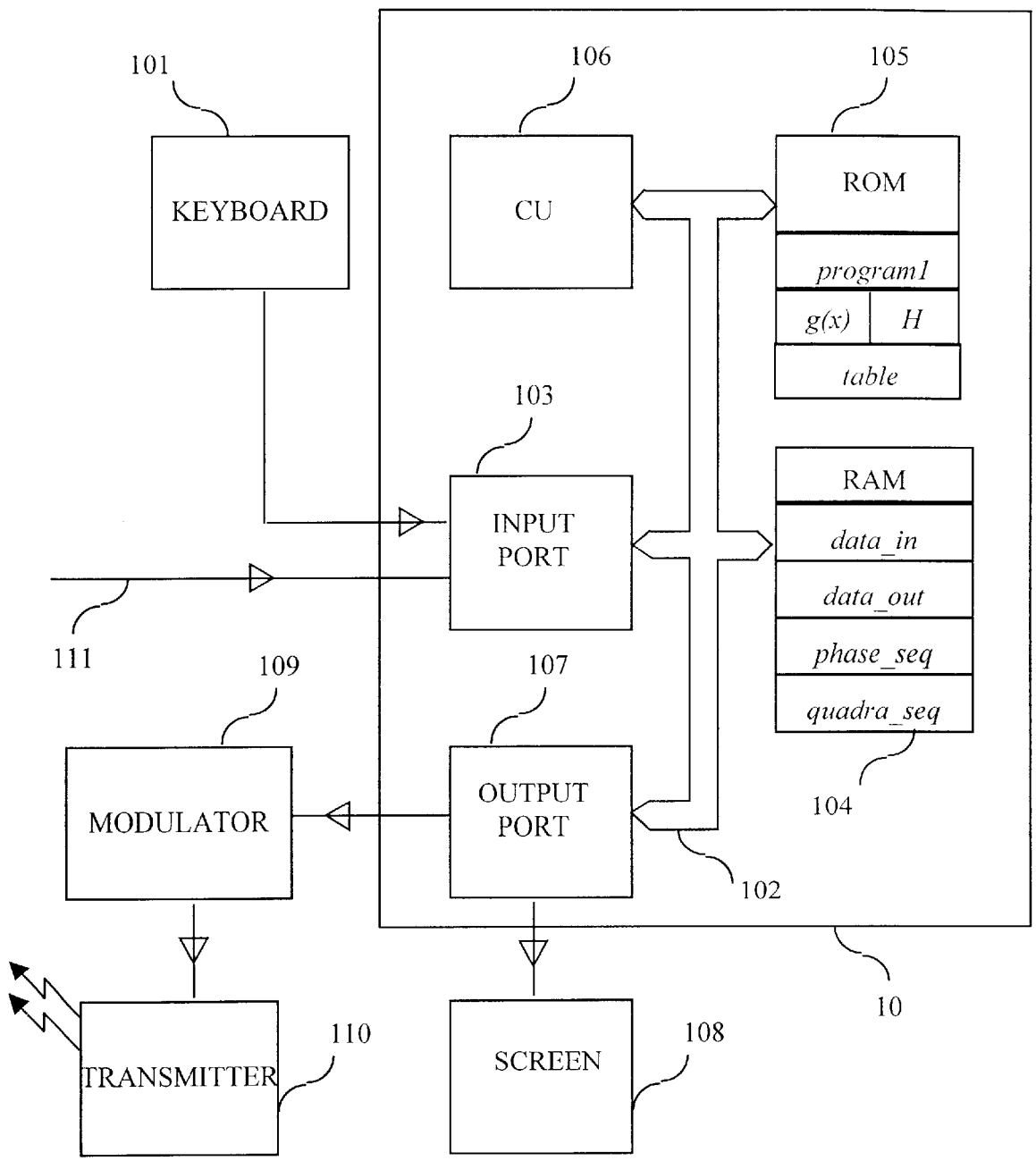
FIG. 1 depicts a coding device in accordance with the present invention.

Before describing a particular embodiment of the present invention, with reference to FIGS. 1 to 4, the mathematical foundations at the root of the present invention will be given here.

I—Brief Presentation of the Present Invention

Let it be considered here that the information to be transmitted is represented in the form of sequences of k symbols of $Z_8$ (for example polynomials of degree k−1). Supplementing these sequences with n−k redundant symbols, sequences of n symbols in $Z_8$ are obtained, and the symbols of A labelled by the said symbols are actually transmitted.

In the embodiment described here, $n=2^m-1$, with m odd. The binary Hamming codes (with binary coefficients) are generated by an irreducible polynomial of degree n in the indeterminate x and primitive (that is to say the first $2^m-1$ powers of x are all different modulo this polynomial).

In accordance with the present invention, this binary polynomial (polynomial in $Z_2$) is lifted into a polynomial in $Z_8$, that is to say with null or positive integer coefficients taking a value between 0 and 7.

Thus a generator polynomial of a code which is composed of the set of multiples of this polynomial taken modulo $x^n-1$ is obtained.

In a particular example embodiment of the present invention, and described with reference to FIGS. 1 to 4, k=26, m=5 and therefore n=31. There is then associated, with all information represented by a polynomial $a(x)=\Sigma a_i x^i$ in $Z_8$ of formal degree 25, a polynomial of formal degree 30 $v(x)=\Sigma v_i x^i$ in $Z_8$, which is a word of the code under consideration.

To that end, one of the following two methods can be used:

multiply the polynomial representing the information (of formal degree 25) by the generator polynomial (which has a degree equal to the degree of the binary generator polynomial, that is here a degree equal to 5); or supplement the polynomial representing the information with five symbols $v_i$ (with i=26, . . . , 30), to obtain the property that the polynomial representing the supplemented sequence is a word of the Hamming code.

The inventor has discovered that the sequences obtained have a Lee distance equal to 5. Therefore, by virtue of the present invention, the errors of Lee weight equal to 1 or 2 can be corrected.

II—Detailed Presentation of the Mathematical Implementation of the Coding

For implementing the present invention, the information transfer method described here is based on a "favourable" labelling of the 8-AM symbols by means of the eight elements of the set $Z_8=\{0, 1, 2, 3, 4, 5, 6, 7\}$, a labelling being "favourable" when, for any pair of adjacent symbols of A, one of the labels is the residue modulo 8 of the other incremented by 1. Similarly, each state of a 64-QAM modulation can be labelled "favourably" by a pair of elements of $Z_8$. Similarly each state of an 8-PSK modulation can be labelled favourably by an element of $Z_8$.

Let m be a positive odd integer number, and let $n=2^m-1$. Let g(x) be a primitive irreducible polynomial of degree m in the Galois field GF(2). This means that g(x) is a divisor of $x^n-1$ and is not a divisor of $x^{n'}-1$ for n>n'>0.

From such a polynomial in GF(2), it is possible to construct, for all the positive integers r, a polynomial of $g^{[r]}(x)$ in the ring $Z_{2^r}=\{0, 1, \ldots, 2^r-2, 2^r-1\}$ in which additions and multiplications are performed modulo $2^r$. This polynomial $g^{[r]}(x)$ is again a divisor of $x^n-1$ considered as a polynomial in $Z_{2^r}$. This construction is known as the "construction by lifting" and it can be described as follows. First, $g(x)=g^{[1]}(x)=o(x)+e(x)$ is written, where o(x) contains all the monomials of g(x) which have an odd degree and e(x) contains all the monomials of g(x) which have an even degree.

This means that the three polynomials $[o(x)]^2$, $[e(x)]^2$ and $[o(x)]^2-[e(x)]^2$ are polynomials in $x^2$ even if their coefficients are not reduced modulo 2. It is chosen to reduce these coefficients modulo 4 and $g^{[2]}(x)$ is defined as the only polynomial which satisfies $g^{[2]}(x^2)=[o(x)]^2-[e(x)]^2$ modulo 4.

For example, starting from $g(x)=x^5+x^2+1$, which is an irreducible primitive polynomial in GF(2) and a divisor of $x^{31}-1$, the following are obtained successively:

$o(x)=x^5, e(x)=x^2+1$, $[o(x)]^2=x^{10}, [e(x)]^2=x^4+2x^2+1$, $[o(x)]^2-[e(x)]^2=x^{10}-x^4-2x^2-1$, $g^{[2]}(x^2)=x^{10}+3x^4+2x^2+3$, $g^{[2]}(x)=x^5+3x^2+2x+3$.

This method can then be iterated by writing:

$g^{[2]}(x)=o^{[2]}(x)+e^{[2]}(x)$ a formula in which of $o^{[2]}(x)$ and $e^{[2]}(x)$ are respectively the odd and even parts of the polynomial $g^{[2]}(x)$. Again, $[o^{[2]}(x)]^2$, $[e^{[2]}(x)]^2$ and their difference are polynomials in $x^2$ and a polynomial $g^{[3]}(x)$ can be defined as the single polynomial in $Z_8$ which satisfies:

$g^{[3]}(x^2)=[o^{[2]}(x)]^2-[e^{[2]}(x)]^2$ modulo 8.

For example, with $g^{[2]}(x)$ given above, the following are obtained successively:

$o^{[2]}(x)=x^5+2x;$ $e^{[2]}(x)=3x^2+3;$ $[o^{[2]}(x)]^2=x^{10}+4x^6+4x^2;$ $[e^{[2]}(x)]^2=9x^4+18x^2+9;$ $[o^{[2]}(x)]^2-[e^{[2]}(x)]^2=x^{10}+4x^6-9x^4-14x^2-9;$ $g^{[3]}(x)=x^5+4x^3+7x^2+2x-9;$

It should be noted that $g^{[2]}(x)$ is a divisor of $x^{31}-1$ considered as the polynomial $x^{31}+3$ in $Z_4$ and that $g^{[3]}(x)$ is a divisor of $x^{31}-1$ considered as the polynomial $X^{31}+7$ in $Z_8$.

By additional iterations of this procedure, a sequence of polynomials $g^{[r]}(x)$ in $Z_{2^r}$, r=1, 2, 3, . . . can be obtained, which are divisors of $x^{31}+2^r-1$, considered also as polynomials in $Z_{2^r}$. However, only the case r=3 has to be considered here in order to describe the present invention.

The codes which are proposed below are cyclic codes of length $n=2^m-1$ (m being an odd integer greater than or equal to 3) generated by a polynomial $g^{[3]}(x)$ obtained by a double lifting of a primitive irreducible polynomial of degree m in GF(2). For simplicity of notation, $g^{[3]}(x)$ is from now on denoted simply by g(x).

For two elements $y_i$ and $v_i$ in $Z_8$, the Lee distance $d_L(y_i, v_i)$ is defined as the minimum of the residues of $y_i-v_i$ and of $v_i-y_i$ taken modulo 8. For two sequences $y=(y_0, \ldots, y_{n-1})$ and $v=(v_0, \ldots, v_{n-1})$ of $Z_8^n$, the Lee distance $d_L(y, v)$ is defined as $\Sigma_{i=0 \text{ to } n-1} d_L(y_i, v_i)$.

III—Numerical Example

Let the following be considered, by way of example: the Hamming code in $Z_8$ of length n equal to 31 and whose generator polynomial is given by $g(x)=x^5+4x^3+7x^2+2x+7$ obtained by two successive liftings of the polynomial $x^5+x^2+1$ with binary coefficients.

The control matrix H of this code is a matrix with 5 rows and 31 columns in $Z_8$ which can be obtained as follows. The 31 columns of H will be numbered from 0 to 30 and the i-th column of H will be denoted by $h_i$. Given that H is the control matrix of a cyclic code in $Z_8$ with generator polynomial g(x), the polynomial $h_i(x)$ can be defined as being the residue $h_{i4}x^4+h_{i3}x^3+h_{i2}x^2+h_{i1}x+h_{i0}$ of $x^i$ calculated modulo g(x), and have associated with it the column vector $h_i=[h_{i4}\ h_{i3}\ h_{i2}\ h_{i1}\ h_{i0}]^T$ in $Z_8$. It is this column vector which is chosen as being the i-th column $h_i$ of the matrix H. Thus, for example, the following are obtained: $h_0(x)=1$, $h_1(x)=x$, . . . , $h_4(x)=x^4$, $h_5(x)=4x^3+x^2+6x+1$, . . . , $h_{15}(x)=7x^4+x^3+3x^2+7x+3$, . . . , $h_{30}(x)=x^4+4\ x^2+7x+2$, and the matrix H corresponding to this construction is given by:

$$H = \begin{matrix} 0 & 0 & 0 & 0 & 1 & 0 & 4 & 1 & 6 & 1 & 1 & 4 & 2 & 5 & 3 & 7 & 1 & 7 & 2 & 2 & 4 & 5 & 5 & 6 & 3 & 7 & 5 & 0 & 3 & 2 & 1 \\ 0 & 0 & 0 & 1 & 0 & 4 & 1 & 6 & 1 & 1 & 4 & 2 & 5 & 3 & 7 & 1 & 7 & 2 & 2 & 4 & 5 & 5 & 6 & 3 & 7 & 5 & 0 & 3 & 2 & 1 & 0 \\ 0 & 0 & 1 & 0 & 0 & 1 & 6 & 5 & 1 & 0 & 6 & 5 & 3 & 3 & 5 & 3 & 6 & 6 & 4 & 5 & 5 & 2 & 7 & 7 & 1 & 4 & 7 & 2 & 5 & 0 & 4 \\ 0 & 1 & 0 & 0 & 0 & 6 & 1 & 0 & 2 & 5 & 4 & 7 & 1 & 0 & 0 & 7 & 5 & 5 & 3 & 3 & 6 & 2 & 2 & 3 & 1 & 0 & 5 & 5 & 5 & 2 & 7 \\ 1 & 0 & 0 & 0 & 0 & 1 & 0 & 4 & 1 & 6 & 1 & 1 & 4 & 2 & 5 & 3 & 7 & 1 & 7 & 2 & 2 & 4 & 5 & 5 & 6 & 3 & 7 & 5 & 0 & 3 & 2 \end{matrix}$$

Then let there be associated, with any polynomial $g(x)=x^m+\Sigma_{i=0}^{m-1} g_i x^i$, its companion matrix R(g) (more simply denoted by R) given by:

$$R(g) = \begin{pmatrix} -g_{m-1} & 1 & 0 & 0 & \ldots & 0 & 0 \\ -g_{m-2} & 0 & 1 & 0 & \ldots & 0 & 0 \\ -g_{m-3} & 0 & 0 & 1 & \ldots & 0 & 0 \\ \ldots & \ldots & \ldots & \ldots & \ldots & \ldots & \ldots \\ -g_1 & 0 & 0 & 0 & \ldots & 1 & 0 \\ -g_0 & 0 & 0 & 0 & \ldots & 0 & 1 \end{pmatrix}$$

In the case where $g(x)=x^5+4x^3+7x^2+2x+7$, this matrix R(g) is given by $$R(g) = \begin{pmatrix} 0 & 1 & 0 & 0 & 0 \\ 4 & 0 & 1 & 0 & 0 \\ 1 & 0 & 0 & 1 & 0 \\ 6 & 0 & 0 & 0 & 1 \\ 1 & 0 & 0 & 0 & 0 \end{pmatrix}$$

It should be noted that, in the general case, the matrix H associated with the polynomial g(x) is characterised by the fact that its i-th column h is given by $h_i=R^i u^T$, modulo 8, where u is the row vector with m components, the first (m−1) of which are null and the last of which is equal to 1.

Such a control matrix specifies a code C, which is the set of all the words $v=(v_0, \ldots, v_{n-1})$, of length n in $Z_8$(here n=31 has been chosen) which satisfy $Hv^T=[0\ 0\ 0\ 0\ 0]^T$ where all operations are carried out modulo 8.

IV—Presentation of a Decoding Method

At decoding, a "hard estimation" of each received signal is performed in such a way that the received sequence is identified with a sequence of elements of $Z_8$. In the case n=31, the received sequence is thus identified with a 31-tuple of elements of $Z_8$.

There is also a control matrix associated with the Hamming code, which expresses the relationships between the letters of a word (here the coefficients of the polynomial of formal degree 30) so that this word is in the code under consideration. This matrix H is of size $m \times (2^m-1)$, that is here: 5×31. A sequence v is in the code if the matrix product $H.v^T$ is the column 5-tuple $[0\ 0\ 0\ 0\ ]^T$.

Let it be assumed that a word v of the code C is transmitted on a channel and received as being the word $r=(r_0, \ldots, r_{n-1})$ in $Z_8$. The decoder then calculates the product $Hr^T$ modulo 8, referred to as the "syndrome" of the received word r, and it is on the basis of this syndrome denoted by s that it will perform its work. It should be noted explicitly that the knowledge of g(x) is equivalent to the knowledge of H or to that of the matrix R as regards specification of the code C.

For describing the decoding, the designation $s^{(q)}$ is used for the column m-tuple s reduced modulo the positive integer number q. Such an m-tuple will be referred to as the reduced syndrome. The different steps of the decoding are then as follows:

1. If s is the null column, v is estimated as being equal to r. Thus, in the example introduced above for n=31, if the first 9 symbols of rare (7 2 5 1 4 2 4 2 1) and if the following 22 are null, $Hr^T$ is the null column and it is therefore accepted that there has been no transmission error.

2. If s is not the null column, different cases can arise:

2.1 If $s^{(2)}$ is not the null column, the decoder calculates the smallest integer value a >0 for which the column vector $R^3s$ reduced modulo 2 is equal to the column m-tuple $u^T$. Given that the period of the residue modulo 2 of x modulo g(x) is equal to $2^m-1$, such a value of a actually exists.

The following notation is then used: $s_M = R^a s$ which is calculated modulo 8 and no longer modulo 2. In this situation, the following cases are distinguished:

2.1.1 If $S_M$ is of the form $[0, \ldots, 0, e]^T$ that is to say if it contains only one non-null component, the decoder will correct r by replacing therein the symbol $r_{n-a}$ by the symbol $r_{n-a}-e$ modulo 8.

Thus, in the example introduced above, if the first 12 symbols of r are (7 7 3 6 0 2 7 2 0 2 7 4) and if the last 19 are null, s is equal to $[3\ 5\ 5\ 0\ 6]^T$, a is equal to 18 and $s_M$ is equal to $[0\ 0\ 0\ 0\ 7]^T$.

The decoding of r will therefore consist of replacing therein $r_{31-18}$ (that is to say $r_{13}$) by $r_{13}-7$; $r_{13}$ being equal to 0 will therefore be replaced by 0−7=1.

2.1.2 If $s_M$ is not of the form $[0, \ldots, 0, e]^T$, that is to say, if it contains one or more non-null (but inevitably even) components among the first m−1, the decoder accepts that two errors of amplitude 1 have been made. It should be noted in this case that the integers between 1 and n−1 have a natural pairing: given a root α of g(x), there exists for any i, $1 \leq i \leq n-1$, a unique integer j(i) with $1 \leq j(i) \leq n-1$, such that $\alpha^i + \alpha^{j(i)}$ is equal to 1 modulo 2. If two errors of amplitude 1 are present in r, $s_M$ is equal to $e_i h_i + e_{j(i)} h_{j(i)}$ where $h_i$ and $h_{j(i)}$ are the columns of H with index i and j(i) and where $e_i$ and $e_{j(i)}$ are in the set $\{1, 7\}$. Estimation of the values of i, j(i), $e_i$ and $e_{j(i)}$ is then carried out as follows. For each of the (n−1)/2 pairs {i, j(i)}, a list is made of the four possible values of the pair ($e_i, e_{j(i)}$) restricted by the fact that these elements are in the set $\{1, 7\}$, until a quadruplet (i, j(i) $e_i, e_{j(i)}$) is found which fulfills the m-tuple $s_M$ calculated in 2.1.

If such a quadruplet is found, the correction of r is performed by replacing therein $r_{n+i-a}$ by $r_{n+i-a}-e_i$ and $r_{n+j(i)-a}$ by $r_{n+j(i)-a}-e_j$. If no such quadruplet is found, an uncorrectable error is declared.

Thus, in the above example for which n=31, if the syndrome s calculated is $[5\ 4\ 0\ 6\ 7]^T$, $S^{(2)}$ is not the null column and the value of a, such that $R^a s$ modulo 2 is equal to $u^T$, is equal to 21. The column $s_M = R^a s$ is then equal to $[0\ 4\ 0\ 6\ 1]^T$. It is not of the form $[0, \ldots, 0, e]$ so that the situation is one of case 2.1.2. In this case there are 15 different pairs {i, j(i)} and for each of them there are 4 pairs of values ($e_i, e_{j(i)}$). There are therefore 60 cases to be listed. The solution i=2, j(i)=5, $e_2$=7, $e_5$=1 is then found which actually verifies $e_2 h_2 + e_5 h_5 = s_M$. The correction therefore consists of replacing $r_{31+2-21}$ (that is to say $r_{12}$) by $r_{12}-e_2 = r_{12}-7$ and of replacing $r_{31+5-21}$ (that is to say $r_{15}$) by $r_{15}-e_5 = r_{15}-1$.

2.2 If $s^{(2)}$ is the null column but $s^{(4)}$ is not the null column (and therefore consequently s is not the null column either), the decoder calculates the smallest integer $a \geq 0$ for which the column vector $R^3 s$ reduced modulo 4 is equal to (0, . . ., 0, e) and it corrects r by replacing therein $r_{n-a}$ by $r_{n-a}-e$.

2.3 Finally, if $s^{(4)}$ is the null column but s is not the null column, the decoder calculates the smallest integer $a \geq 0$ for which $R^a s$ is equal to (0, . . . 0, 4) and it corrects r by replacing therein $r_{n-a}$ by $r_{n-a}-4$.

Finally, if the decoding device cannot effectively implement the algorithm described above, or if it produces a word which is not in the code, an uncorrectable error is detected.

It should be noted that, by this method, a single erroneous symbol in a word can always be corrected and that two erroneous symbols can be corrected when the effect of each of these errors is the removal or addition of 1 modulo 8 from/to a label.

V—Description of a Particular Embodiment

There will now be described, with reference to FIGS. 1 to 4, a particular embodiment of the present invention, adapted to transmit information in the form of sequences of quadrature amplitude modulated signals, each carrier being modulated in 8 states.

In FIG. 1, the coding device is illustrated in block diagram form and represented by general reference 10 and has, interconnected by an address and data bus 102:

- a central processing unit 106;
- a random access memory RAM 104;
- a read-only memory ROM 105;
- an input port 103 used to receive, in the form of binary data, information which the coding device has to transmit;
- an output port 107 allowing the coding device to transmit two sequences of symbols of the transmission channel alphabet, here composed of a 64-state alphabet known by the name "64-QAM" and used by a modulator 109 performing a quadrature amplitude modulation with 64 states representing two sequences of symbols of two code words which come from the output port 107;

and, independently of the bus 102

- a transmitter 110 having an ultrahigh frequency interface circuit which performs the transposition of the signal modulated by the modulator 109 to a carrier frequency and its amplification, and a transmitting antenna which broadcasts this transposed and amplified signal;
- a display screen 108 connected to the output port 107;
- a keyboard 101 connected to the input port 103 and supplying bytes representing successively used keyboard keys; and
- an input 111 of data to be transmitted, in the form of binary data, connected to the input port 103.

Each of the elements illustrated in FIG. 1 is well known to persons skilled in the art of transmission systems and, more generally, information processing systems. These elements are therefore not described here.

It should be noted here that the word "register" used below designates, in each of the memories, both a memory area of small capacity (storing only a few binary data items) and a memory area of large capacity (allowing storage of a complete program).

The random access memory 104 stores data, variables and intermediate processing results, in memory registers having, in the remainder of the description, the same names as the data whose values they store. The random access memory 104 has notably:

- a register "data_in" in which is stored a sequence of information symbols to be transmitted, each symbol belonging to the alphabet A={0, 1, 2, 3, 4, 5, 6, 7} and coming from the input port 103,
- a register "data_out" in which is stored a sequence of symbols to be transmitted which is formed from the sequence of information symbols supplemented by redundant symbols which belong to the alphabet A, a register "phase_seq" in which is stored the sequence of symbols of the transmission channel alphabet which corresponds to the components in phase, and a register "quadra_seq" in which is stored the sequence of symbols of the transmission channel alphabet which corresponds to the components in phase quadrature.

The random access memory 104 constitutes an information storage means readable by a computer or a microprocessor. It stores data resulting from the implementation of the method to which the present invention relates, that is to say coded data.

According to a variant, the random access memory 104 is removable, partially or totally, and includes, for example, a magnetic tape or a diskette.

The read-only memory 105 is adapted to store:

the operating program of the central processing unit 106, in a register "program1", the generator polynomial $g(x)=x^5+4x^3+7x^2+2x+7$, in a register "g", the control matrix H associated with the lifted Hamming code, in a register "H", the table 1 which associates, with each element of the alphabet A, an element of $Z_8$, in a register "table", The read-only memory 105 constitutes an information storage means readable by a computer or a microprocessor. It stores instructions of a computer program which allows the implementation of the coding method which is the object of the invention.

According to a variant, the read-only memory 105 is removable, partially or totally, and includes, for example, a magnetic tape, a diskette or a CD-ROM.

By way of example of the table 1, the elements of the alphabet A are labelled as follows:

| Alphabet A | Element of $Z_8$ |
|---|---|
| −7 | 0 |
| −5 | 1 |
| −3 | 2 |
| −1 | 3 |
| 1 | 4 |
| 3 | 5 |
| 5 | 6 |
| 7 | 7 |

Figure 2:
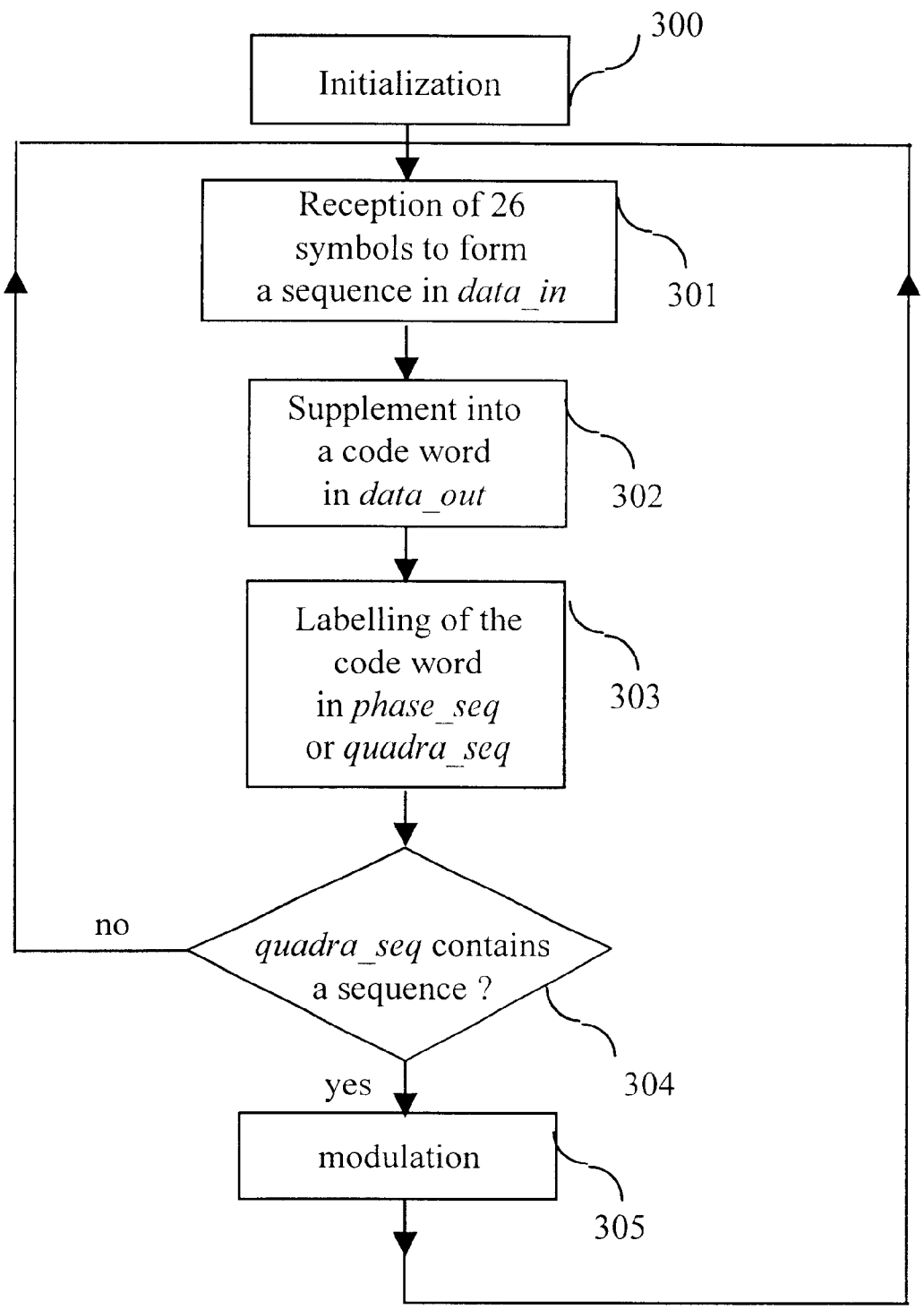
FIG. 2 depicts a coding algorithm used by the coding device illustrated in FIG. 1.

The central processing unit 106 is adapted to implement the flow diagram described in FIG. 2. In this FIG. 2, it may be seen that, during an operation 300, the initialization is performed of the transmission device illustrated in FIG. 1.

Next, during an operation 301, the first 26 information symbols to be transmitted, received on the input 111, are organized into a sequence of 26 symbols, in the register "data_in".

Then, during an operation 302, these sequences are supplemented to form a sequence of 31 symbols, by adding 5 redundant symbols which guarantee the divisibility of the polynomial representation of the sequence thus formed by the polynomial $g(x)=x^5+4x^3+7x^2+2x+7$. The sequence thus formed is placed in the register "data_out".

Next, during an operation 303, the symbols of the sequence stored in the register "data_out" are labelled, in accordance with the labelling depicted by the table 1, and placed in the register "phase_seq", if it does not already contain a sequence, and in the register "quadra_seq" in the contrary case.

During a test 304, the central unit 106 determines whether or not the register "quadra_seq" contains a sequence. When the result of the test 304 is positive, during an operation 305, the sequences stored in the registers "phase_seq" and "quadra_seq", which represent amplitudes, are transmitted to the modulator 109 in order to simultaneously modulate the two phases of the signal by quadrature amplitude modulation. During this operation, the registers "phase_seq" and "quadra_seq" are emptied. Then the operation 301 is reiterated.

When the result of the test 304 is negative, the operation 301 is reiterated.

The decoding performed in accordance with the invention will now be described, particularly adapted here to a channel close to a theoretical channel with Additive White Gaussian Noise, also known by the initials AWGN.

Thus, in accordance with the present invention, the information transfer method (respectively the information transfer device) uses:

an alphabet $Z_{2^t}=\{0, 1, 2, \ldots 2^t-1\}$ having $2^t$ elements, where t is at least equal to 3, and in which additions and multiplications are carried out modulo $2^t$, and a cyclic code, possibly abbreviated, referred to as a "lifted Hamming code" obtained by lifting a binary Hamming code, and whose generator polynomial is the lifting into $Z_{2^t}$ of a generator polynomial of odd degree in $\{0, 1\}$ of such a binary Hamming code; and it includes:

an operation of coding 302 of the information by a sequence of words of the said lifted Hamming code, a labelling operation 303, during which each letter of the alphabet $Z_{2^t}$ is used to label a letter of a numerical alphabet A, so that, for any pair of so-called "adjacent" symbols of A, the label of one of these symbols is the residue modulo $2^t$ of the label of the other incremented by 1, for each word of the said lifted Hamming code, an operation of transmission 305 of signals, a physical quantity of which is proportional to the elements of A labelled by each of the symbols of the words of the said lifted Hamming code.

Figure 3:
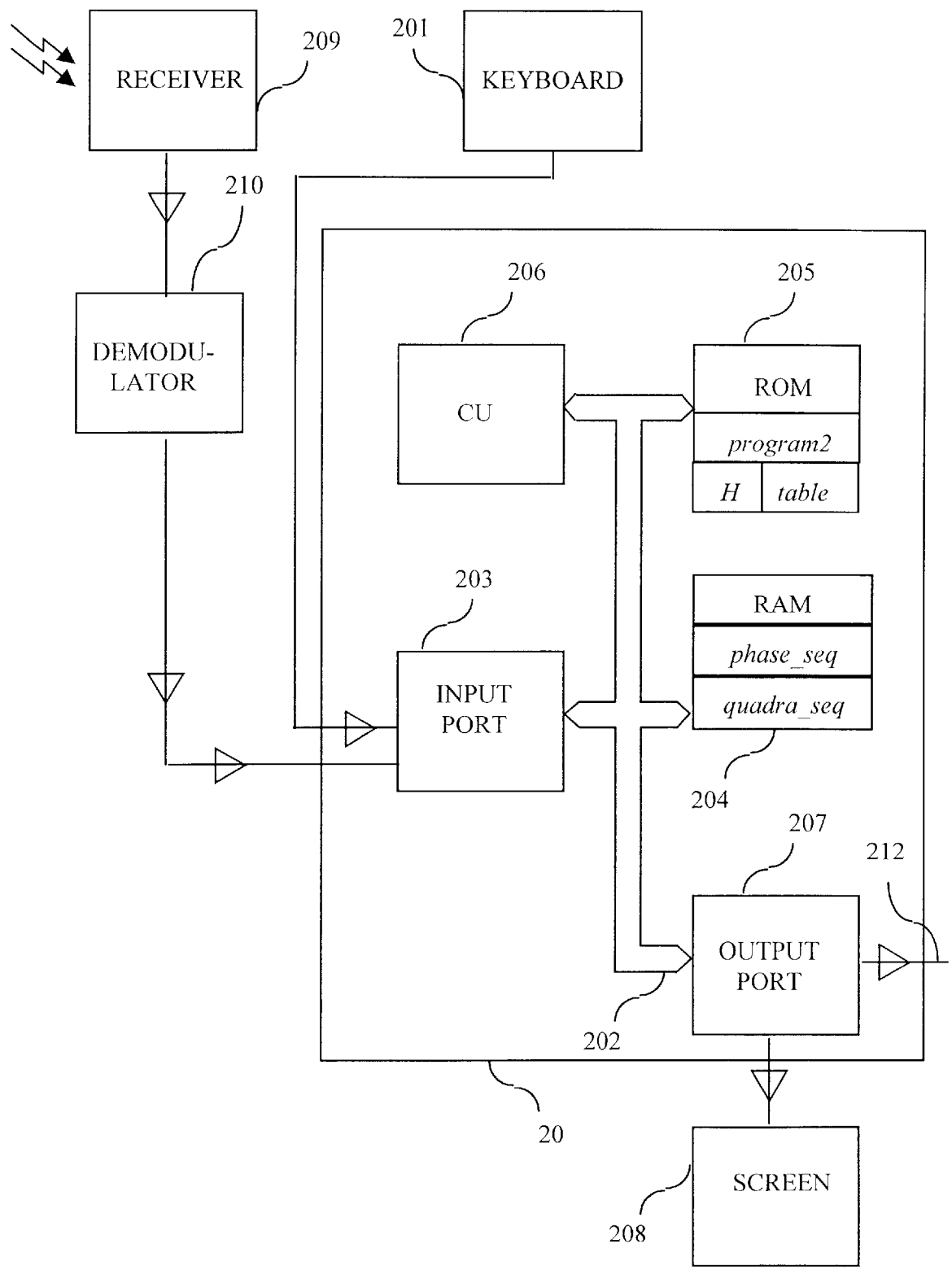
FIG. 3 depicts a decoding device in accordance with the present invention and adapted to decode the signals sent by the coding device illustrated in FIG. 1.

In the embodiment described and depicted:

during the said coding operation, the polynomial representing the information is multiplied by the generator polynomial of the said lifted Hamming code; or during the said coding operation, the sequences representing the information are supplemented, so that each supplemented sequence is a word of the lifted Hamming code;

The decoding device depicted in FIG. 3, as general reference 20, is illustrated in block diagram form. It has, interconnected by an address and data bus 202:

a central processing unit 206 a random access memory RAM 204;

a read-only memory ROM 205;

an input port 203 used to receive information which the decoding device has to process, store or transmit;

an output port 207 allowing the decoding device to transmit sequences of decoded binary information; and, independently of the bus 202:

a receiver 209 having a receiving antenna which receives a signal representing the signal sent by the transmitting antenna 110 of a coding device, and an ultrahigh frequency interface circuit which performs an automatic gain control and a transposition into baseband of the received signal;

a demodulator 210, connected to the input port 203, performing a demodulation, in the form of two sequences of symbols of A(8), representing sequences of symbols received by the antenna 209 and previously modulated by 64-state quadrature amplitude modulation, by the device illustrated in FIG. 1;

a display screen 208 connected to the output port 207; and a keyboard 201 connected to the input port 203.

Each of the elements illustrated in FIG. 3 is well known to persons skilled in the art of information decoding systems and, more generally, information processing systems. These elements are therefore not described here.

The random access memory 204 stores data, variables and intermediate processing results, in memory registers having, in the remainder of the description, the same names as the data whose values they store. The random access memory 204 has notably:

a register "phase_seq" in which is stored the sequence of received symbols which corresponds to the components in phase, and a register "quadra_seq" in which is stored the sequence of received symbols which corresponds to the components in phase quadrature.

It should be noted here that a hard decoding is carried out, the sequences of received symbols being respectively estimated as numbers of the transmission channel alphabet.

The read-only memory 205 is adapted to store:

the operating program of the central processing unit 206, in a register "program2", the control matrix H associated with the lifted Hamming code, in a register "H", the table 1 which associates, with each element of the alphabet A, an element of $Z_8$, in a register "table", The read-only memory 205 constitutes an information storage means readable by a computer or a microprocessor. It stores instructions of a computer program which allows the implementation of the decoding method which is the object of the invention.

According to a variant, the read-only memory 205 is removable, partially or totally, and includes, for example, a magnetic tape, a diskette or a CD-ROM.

Figure 4:
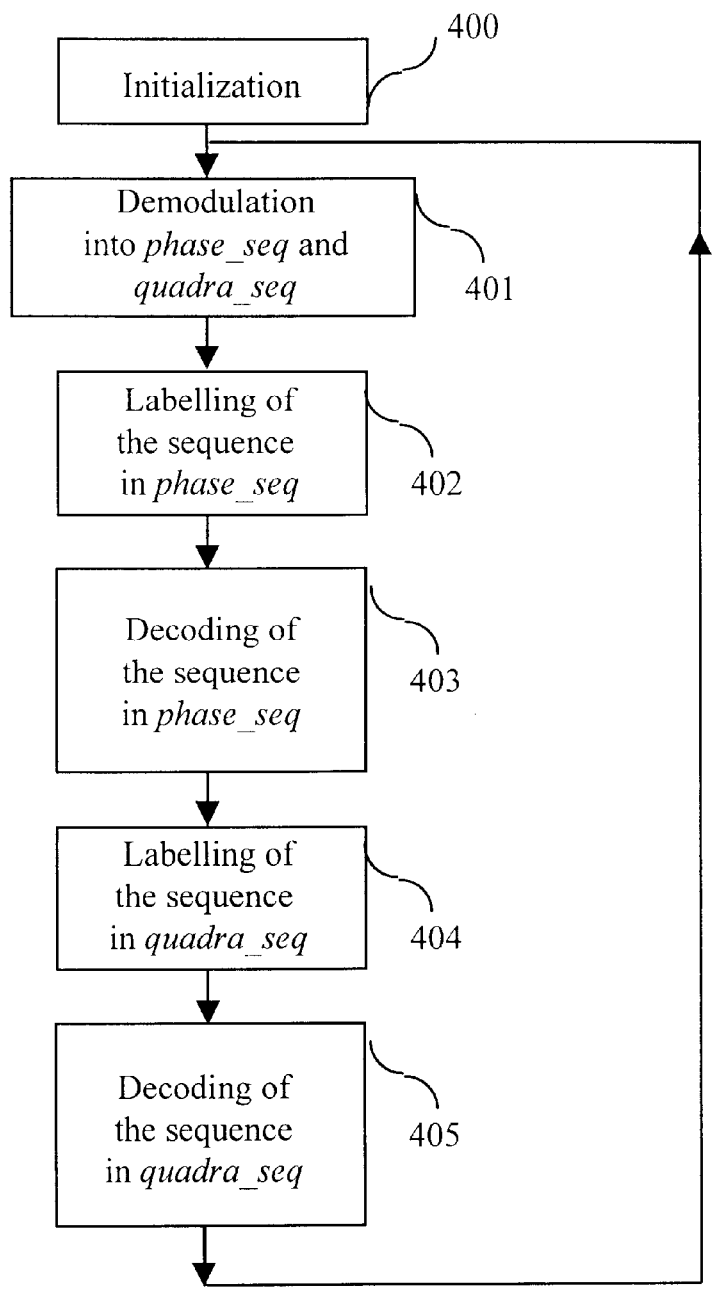
FIG. 4 depicts a decoding algorithm used by the decoding device illustrated in FIG. 3.

The central processing unit 206 is adapted to implement the flow diagram described in FIG. 4. In FIG. 4, it may be seen that, during the operation 400, the receiving device illustrated in FIG. 3 is initialized.

Then, during an operation 401, the first received demodulated sequence is placed:

in the register "phase_seq" for the demodulated amplitudes of the signal in phase, and in the register "quadra_seq" for the demodulated amplitudes of the signal in phase quadrature.

Then, during an operation 402, the symbols of the sequence "phase$_{13}$ seq" are labelled with symbols of $Z_8$, in accordance with the table 1.

Next, during an operation 403, the decoding processing described above is performed on the sequence "phase_seq" and the information sequence resulting therefrom or the error detection declaration is transmitted to the output port 207.

Then, during an operation 404, the symbols of the sequence "quadra_seq" are labelled with symbols of $Z_8$, in accordance with the table 1.

Next, during an operation 405, the decoding processing described above is performed on the sequence "quadra_seq" and the information sequence resulting therefrom or the error detection declaration is transmitted to the output port 207.

The operation 401 is next reiterated.

Thus, in accordance with the present invention, the information receiving method (and respectively, the information receiving device) uses;

a numerical alphabet A, an alphabet $Z_{2^t} = \{0, 1, 2, \ldots 2^t - 1\}$ having $2^t$ elements, where t is at least equal to 3, and in which additions and multiplications are carried out modulo $2^t$, and a cyclic code, possibly abbreviated, referred to as a "lifted Hamming code" obtained by lifting a binary Hamming code, and whose generator polynomial is the lifting into $Z_{2^t}$ of a generator polynomial of odd degree in $\{0, 1\}$ of such a binary Hamming code; and it includes:

an operation of demodulation 401 of each received signal producing at least one letter of the alphabet A, a labelling operation, during which each letter of the numerical alphabet A is labelled by a letter of the alphabet $Z_{2^t}$, so that, for any pair of so-called "adjacent" symbols of A, the label of one of these symbols is the residue modulo $2^t$ of the label of the other incremented by 1, an operation of decoding each sequence of labels v, into a sequence r of the said lifted Hamming code.

In the embodiment described and depicted, the decoding operation includes, for each sequence of labels, an error correction operation which:

either affects only a single element of the said sequence, or affects two elements of the said sequence, the error in each of the said elements having a Lee weight equal to one.

Moreover, in the embodiment described and depicted:

the decoding operation includes an operation of determining a syndrome s equal to the product $Hr^T$, modulo $2^t$, where H is the control matrix of the lifted Hamming code used;

the error correction operation includes:

an operation of verifying that the syndrome is compatible with an error affecting only one element of the sequence of labels, in the negative case, an operation of determining the couples of erroneous element positions compatible with the syndrome, couples the number of which is at most equal to half the length of the lifted Hamming code;

the decoding operation includes an operation of determining at least one reduced syndrome, the m-tuple $s^{(q)}$ equal to the column m-tuple s reduced modulo the positive integer number q equal to a power of 2;

as a preliminary to the decoding operation, an operation is implemented of calculating the residue modulo 8, of each element of the syndrome s equal to the product $Hr^T$, modulo $2^t$, where H is the control matrix of the lifted Hamming code used;

the decoding operation includes the determination of each position of a possibly erroneous element, using the said residue; the decoding operation includes, moreover, a search for the error compatible with each said position of a possibly erroneous element and with the said syndrome before reduction modulo 8;

during the decoding operation, if a number of errors are compatible with each said position of a possibly erroneous element and with the said syndrome, the selection is made, as the estimate of the error, of the one which has the smallest Lee weight.

The invention described above, with reference to FIGS. 1 to 4, makes it possible to correct all errors affecting only one symbol of a word and errors affecting two symbols, provided that the effect of each of these errors is the removal or addition of 1 modulo 8, from/to a label. The embodiment described above is an application to 8-AM modulation. Application to 8-PSK modulation is made without difficulty. In this application, the eight signals forming the channel alphabet are eight regularly distributed phases modulating a known carrier. It is sufficient, in order to apply the invention, to appropriately label these eight phases so that two consecutive phases are labelled by elements of $Z_8$ such that one is obtained from the other by addition of 1 modulo 8.

The particular case described is the one where the length n of the code is a maximum in the sense that it is equal to $2^m-1$, (where, as indicated above, m is an odd number). It has been seen that, in this case, the number k of information symbols in each word of the code is equal to n−m. Application to abbreviated codes, that is to say those of length strictly less than n, is made without difficulty.

For this, a number k'<k=n−m is chosen, and the information is represented by a sequence of polynomials with coefficients in $Z_8$ of formal degree k'−1 instead of k−1. The coding is then carried out, for example, by multiplying each polynomial by the generator polynomial of the Hamming code in $Z_8$, or by supplementing it with m coefficients (those of $x^{k'}$, of $x^{k'+1}$, ..., of $x^{k'+m-1}$) so that the polynomial finally obtained is a multiple of the said generator polynomial. At decoding, the labels $v_i$, for i=0, ..., k'+m−1, of the k'+m received symbols are supplemented by k−k' labels $v_i$, for i=k'+m, ..., n=k+m−1, equal to zero, in the last k−k' positions of the word. It is this supplemented word which is then decoded as explained above. Where the correction produced by the decoding algorithm consists of modifying one or more of the last k−k' positions of the said word, a decoding error is detected.

The invention also applies to 16-AM modulation, and more generally to any modulation of the $2^t$-AM type, where t is equal to or greater than 4. In this case, a simple additional phase is necessary at decoding:

as a preliminary to the decoding operation, an operation is performed of calculating the residue modulo 8, of each element of the syndrome s equal to the product $Hr^T$, modulo $2^t$, where H is the control matrix of the lifted Hamming code used and during the decoding operation:

each position of a possibly erroneous element is determined using the said residue, a search is made for the error compatible with each said position of a possibly erroneous element and with the said syndrome before reduction modulo 8, and if a number of errors are compatible with each said position of a possibly erroneous element and with the said syndrome, a selection is made, as the estimate of the error, of the one which has the smallest Lee weight, or preferentially, the one which is the most probable, in view of the characteristics of the channel.

This is explained in the case of 16-AM modulation and the binary Hamming code of length 31 lifted into the alphabet $Z_{16}=\{0, 1, 2, ..., 15\}$. With these parameters, the generator polynomial of the code is $g(x)=x^5+8x^4+4x^3+15x^2+2x+15$, and the information is represented by a polynomial of formal degree 25 in $Z_{16}$. This polynomial is then coded into a polynomial of formal degree 30 in $Z_6$, and a multiple of g(x). The sequence of corresponding signals is transmitted on a channel and the sequence of labels corresponding to the sequence of received signals is represented by $r=(r_0, ..., r_{30})$. These elements $r_i$ of the latter sequence are therefore elements of $Z_{16}$. Before decoding, each of these $r_i$ will first be replaced by its residue modulo 8, which will be denoted by $w_i$, and $w=(w_0, ..., w_{30})$ will be written.

With a concern for accuracy, it should be pointed out explicitly that the residue modulo 8 of an integer number is the single element of $Z_8$ which produces a multiple of 8 when it is subtracted from the integer number in question. This 31-tuple w is then decoded as if it were a received word corresponding to the sending of a word of the Hamming code of length 31, lifted into $Z_8$. The estimate of the error obtained by the decoding algorithm described above for the Hamming codes lifted into $Z_8$ is then denoted by $e=(e_0, ..., e_{30})$. However, the components $e_i$ of this error e will be interpreted as being able to have the values $e_i$ and $e_i-8$.

Let an n-tuple resulting from any one of these interpretations be referred to as f. To an error e which is non-null modulo 8 there therefore corresponds more than one such interpretation n-tuple f. Each of these interpretation n-tuples is then subtracted from the sequence r of output labels in order to provide, after reduction modulo 16, a decoded sequence d. If no sequence d is in the Hamming code, lifted into $Z_{16}$, an error is detected. Otherwise, the sequence d forming part of the code which is closest to r (in the Lee distance sense) is chosen as the estimate of the transmitted sequence.

It should be noted that, in $Z_{16}$, when the syndrome reduced modulo 8 is null, but the syndrome is not null, it is compatible with the situation where the error word e has only one non-null element, that being equal to 8. Determination of the error on the channel then takes this characteristic into account.

In a manner similar to what is said above on the subject of 8-AM and 64-QAM modulations, each symbol of 256-QAM modulation can be interpreted as a pair of symbols of 16-AM modulation. More generally, each symbol of $2^{2t}$-QAM modulation can be interpreted as a pair of symbols of $2^t$-AM modulation.

What is claimed is:

1. Information transfer method, characterised in that: it uses:

an alphabet $Z_{2^t}=\{0, 1, 2, ... 2^t-1\}$ having $2^t$ elements, where t is at least equal to 3, and in which additions and multiplications are carried out modulo $2^t$, and a cyclic code, possibly abbreviated, referred to as a lifted Hamming code obtained by lifting a binary Hamming code, and whose generator polynomial is the lifting into $Z_{2^t}$ of a generator polynomial of odd degree in {0, 1} of such a binary Hamming code; and it includes:

an operation of coding (302) the information by a sequence of words of the said lifted Hamming code, a labelling operation (303), during which each letter of the alphabet $Z_{2^t}$ is used to label a letter of a numerical alphabet A, so that, for any pair of adjacent symbols of A, the label of one of these symbols is the residue modulo $2^t$ of the label of the other incremented by 1, for each word of the said lifted Hamming code, an operation of transmitting (305) signals, a physical quantity of which is proportional to the elements of A labelled by each of the symbols of the words of the said lifted Hamming code.

2. Information transfer method according to claim 1, characterised in that, during the said coding operation (302), the polynomial representing the information is multiplied by the generator polynomial of the said lifted Hamming code.

3. Information transfer method according to claim 1, characterised in that, during the said coding operation (302), the sequences representing the information are supplemented, so that each supplemented sequence is a word of the lifted Hamming code.

4. Information transfer method according to any one of claims 1 to 3, characterised in that, during the signal transmission operation (305), the said physical quantity which is proportional to the elements of A is an amplitude of an amplitude modulated signal.

5. Information transfer method according to any one of claims 1 to 3, characterised in that, during the signal transmission operation (305), the said physical quantity which is proportional to the elements of A is one of the two amplitudes of a quadrature amplitude modulated signal.

6. Information transfer method according to any one of claims 1 to 3, characterised in that, during the signal transmission operation (305), the said physical quantity which is proportional to the elements of A is a phase.

7. Information receiving method, characterised in that: it uses:
   a numerical alphabet A,
   an alphabet $Z_{2^t} = \{0, 1, 2, \ldots 2^t-1\}$ having $2^t$ elements, where t is at least equal to 3, and in which additions and multiplications are carried out modulo $2^t$, and
   a cyclic code, possibly abbreviated, referred to as a lifted Hamming code obtained by lifting a binary Hamming code, and whose generator polynomial is the lifting into $Z_{2^t}$ of a generator polynomial of odd degree in $\{0, 1\}$ of such a binary Hamming code; and
it includes:
   an operation of demodulating (401) each received signal producing at least one letter of the alphabet A,
   a labelling operation (402, 404), during which each letter of the numerical alphabet A is labelled by a letter of the alphabet $Z_{2^t}$, so that, for any pair of adjacent symbols of A, the label of one of these symbols is the residue modulo $2^t$ of the label of the other incremented by 1,
   an operation of decoding (403, 405) each sequence of labels v, into a sequence r of the said lifted Hamming code.

8. Information receiving method according to claim 7, characterised in that the decoding operation (403, 405) includes, for each sequence of labels, an error correction operation which:
   either affects only a single element of the said sequence,
   or affects two elements of the said sequence, the error in each of the said elements having a Lee weight equal to one.

9. Information receiving method according to either one of claims 7 or 8, characterised in that the decoding operation (403, 405) includes an operation of determining a syndrome s equal to the product $Hr^T$, modulo $2^t$, where H is the control matrix of the lifted Hamming code used.

10. Information receiving method according to claims 8 and 9, characterised in that the error correction operation includes:
   an operation of verifying that the syndrome is compatible with an error affecting only one element of the sequence of labels,
   in the negative case, an operation of determining couples of positions of erroneous elements compatible with the syndrome, couples the number of which is at most equal to half the length of the lifted Hamming code.

11. Information receiving method according to claim 10, characterised in that the decoding operation (403, 405) includes an operation of determining at least one reduced syndrome, the m-tuple $s^{(q)}$ equal to the column m-tuple s reduced modulo the positive integer number q equal to a power of 2.

12. Information receiving method according to any one of claims 7 to 11, characterised in that:
   it includes, as a preliminary to the decoding operation (403, 405), an operation of calculating the residue modulo 8, of each element of the syndrome s equal to the product $Hr^T$, modulo $2^t$, where H is the control matrix of the lifted Hamming code used and
   the decoding operation includes the determination of each position of a possibly erroneous element, using the said residue.

13. Information receiving method according to claim 12, characterised in that the decoding operation (403, 405) includes, moreover, a search for the error compatible with each said position of a possibly erroneous element and with the said syndrome before reduction modulo 8.

14. Information receiving method according to claim 13, characterised in that, during the decoding operation (403, 405), if a number of errors are compatible with each said position of a possibly erroneous element and with the said syndrome, the selection is made, as the estimate of the error, of the one which has the smallest Lee weight.

15. Information transfer device, characterised in that it has:
   A/ a processing means (104, 105, 106) adapted:
   to use:
      an alphabet $Z_{2^t} = \{0, 1, 2, \ldots 2^t-1\}$ having $2^t$ elements, where t is at least equal to 3, and in which additions and multiplications are carried out modulo $2^t$, and
      a cyclic code, possibly abbreviated, referred to as a lifted Hamming code obtained by lifting a binary Hamming code, and whose generator polynomial is the lifting into $Z_{2^t}$ of a generator polynomial of odd degree in $\{0, 1\}$ of such a binary Hamming code; and
   to code the information by a sequence of words of the said lifted Hamming code,
   to label each letter of the alphabet A by a letter of the alphabet $Z_{2^t}$, so that, for any pair of adjacent symbols of A, the label of one of these symbols is the residue modulo $2^t$ of the label of the other incremented by 1, and
   B/ a transmission means (109, 110) adapted, for each word of the said lifted Hamming code, to transmit signals, a physical quantity of which is proportional to the elements of A labelled by each of the symbols of the words of the said lifted Hamming code.

16. Information transfer device according to claim 15, characterised in that the processing means (104, 105, 106) is adapted, in order to code the information by a sequence of words of the said lifted Hamming code, to multiply the polynomial representing the information by the generator polynomial of the said lifted Hamming code.

17. Information transfer device according to claim 15, characterised in that the processing means (104, 105, 106) is adapted, in order to code the information by a sequence of words of the said lifted Hamming code, to supplement the sequences representing the information, so that each supplemented sequence is a word of the lifted Hamming code.

18. Information transfer device according to any one of claims 15 to 17, characterised in that the transmission means (109, 110) is adapted, for the transmission of signals, so that the said physical quantity which is proportional to the elements of A is an amplitude of an amplitude modulated signal.

19. Information transfer device according to any one of claims 15 to 17, characterised in that the transmission means (109, 110) is adapted, for the transmission of signals, so that the said physical quantity which is proportional to the elements of A is one of the two amplitudes of a quadrature amplitude modulated signal.

20. Information transfer device according to any one of claims 15 to 17, characterised in that the transmission means (109, 110) is adapted, for the transmission of signals, so that the said physical quantity which is proportional to the elements of A is a phase.

21. Information receiving device, characterised in that it has: A/ a signal receiving means (209, 210) adapted to demodulate each received signal in order to produce at least one letter of the alphabet A, B/ a processing means (204, 205, 206) adapted:

to use:

a numerical alphabet A, an alphabet $Z_{2^t}\{0, 1, 2, \ldots 2^t-1\}$ having $2^t$ elements, where t is at least equal to 3, and in which additions and multiplications are carried out modulo $2^t$, and a cyclic code, possibly abbreviated, referred to as a lifted Hamming code obtained by lifting a binary Hamming code, and whose generator polynomial is the lifting into $Z_{2^t}$ of a generator polynomial of odd degree in $\{0, 1\}$ of such a binary Hamming code; and to label each letter of the numerical alphabet A by a letter of the alphabet $Z_{2^t}$, so that, for any pair of adjacent symbols of A, the label of one of these symbols is the residue modulo $2^t$ of the label of the other incremented by 1, to decode each sequence of labels v, into a sequence r of the said lifted Hamming code.

22. Information receiving device according to claim 21, characterised in that the processing means (204, 205, 206) is adapted, in order to decode each sequence of labels v, into a sequence r of the said lifted Hamming code, to correct, for each sequence of labels, each error which:

either affects only a single element of the said sequence, or affects two elements of the said sequence, the error in each of the said elements having a Lee weight equal to one.

23. Information receiving device according to either one of claims 21 or 22, characterised in that the processing means (204, 205, 206) is adapted, in order to decode each sequence of labels v, into a sequence r of the said lifted Hamming code, to determine a syndrome s equal to the product $Hr^T$, modulo $2^t$, where H is the control matrix of the lifted Hamming code used.

24. Information receiving device according to claims 22 and 23, characterised in that the processing means (204, 205, 206) is adapted, in order to correct errors:

to verify whether the syndrome is compatible with an error affecting only one element of the sequence of labels, in the negative case, to determine couples of positions of erroneous elements compatible with the syndrome, couples the number of which is at most equal to half the length of the lifted Hamming code.

25. Information receiving device according to claim 24, characterised in that the processing means (204, 205, 206) is adapted, in order to decode each sequence of labels v, into a sequence r of the said lifted Hamming code, to determine at least one reduced syndrome, the m-tuple $s^{(q)}$ equal to the column m-tuple s reduced modulo the positive integer number q equal to a power of 2.

26. Information receiving device according to any one of claims 21 to 25, characterised in that:

the processing means (204, 205, 206) is adapted, as a preliminary to the decoding, to calculate the residue modulo 8, of each element of the syndrome s equal to the product $Hr^T$, modulo $2^t$, where H is the control matrix of the lifted Hamming code used and in order to decode each sequence of labels v, into a sequence r of the said lifted Hamming code, to determine each position of a possibly erroneous element, using the said residue.

27. Information receiving device according to claim 26, characterised in that the processing means (204, 205, 206) is adapted, in order to decode each sequence of labels v, into a sequence r of the said lifted Hamming code, to search for the error compatible with each said position of a possibly erroneous element and with the said syndrome before reduction modulo 8.

28. Information receiving device according to claim 27, characterised in that the processing means (204, 205, 206) is adapted, in order to decode each sequence of labels v, into a sequence r of the said lifted Hamming code, if a number of errors are compatible with each said position of a possibly erroneous element and with the said syndrome, to select, as the estimate of the error, the one which has the smallest Lee weight.

29. Network station, characterised in that it has an information transfer device according to any one of claims 15 to 20.

30. Network station, characterised in that it has an information receiving device according to any one of claims 21 to 28.

31. Information storage device readable by a computer or a microprocessor storing instructions of a computer program, characterized in that it allows the implementation of an information transfer method according to any one of claims 1 to 6 and/or an information receiving method according to any one of claims 7 to 14.

32. Information storage device according to claim 31, characterized in that it is partially or totally removable.

* * * * *

UNITED STATES PATENT AND TRADEMARK OFFICE
CERTIFICATE OF CORRECTION

PATENT NO. : 6,421,806 B1
DATED : July 16, 2002
INVENTOR(S) : Philippe Piret

It is certified that error appears in the above-identified patent and that said Letters Patent is hereby corrected as shown below:

Title page,
Item [57], ABSTRACT,
Line 13, "by 1," should read -- by 1; and --.

Column 3,
Line 37, "by 1," should read -- by 1; and --;
Line 50, "labels," should read -- labels; and --.

Column 4,
Line 59, "by 1," should read -- by 1; and --.

Column 6,
Line 46, "are" should read -- is --;
Line 58, "of" should be deleted.

Column 7,
Line 65, "$X^m + \Sigma_{i=0}$ to m-1" should read -- $X^m + \Sigma_{i=0 \text{ to } m-1}$ --.

Column 8,
Line 24, "are" should read -- is --.

Column 9,
Line 1, "rare" should read -- r are --;
Line 13, "$S_M$" should read -- $s_M$ --;
Line 32, "is" should read -- which is --;
Line 46, "$S^{(2)}$" should read -- $s^{(2)}$ --;
Line 56, " r31+ 5-21" should read -- $r_{31+5-21}$ --.

Column 13,
Line 52, ""$phase_{13}$ seq"" should read -- "phase __ seq" --;
Line 67, "401is" should read -- 401 is --.

Column 14,
Line 20, "by 1," should read -- by 1, and --;
Line 56, "residue; the" should read -- residue; ¶ the --.

Column 16,
Line 56, "by 1," should read -- by 1; and --.

UNITED STATES PATENT AND TRADEMARK OFFICE
CERTIFICATE OF CORRECTION

PATENT NO.   : 6,421,806 B1
DATED        : July 16, 2002
INVENTOR(S)  : Philippe Piret It is certified that error appears in the above-identified patent and that said Letters Patent is hereby corrected as shown below:

Column 17,
Line 37, "by 1," should read -- by 1; and --;
Line 54, "claims 8" should read -- claim 8, --;
Line 55, "and 9," should be deleted;
Line 60, "labels," should read -- labels; and --.

Column 18,
Line 3, "any one of" should be deleted;
Line 4, "claims 7 to 11," should read -- claim 7 or claim 8, --;
Line 9, "used" should read -- used; --.

Column 19,
Line 17, "$Z_2t\{0, 1, 2,$" should read -- $Z_2t = \{0, 1, 2,$ --;
Line 28, "by 1," should read -- by 1; and --;
Line 53, "labels," should read -- labels; and --.

Column 20,
Line 12, "any one of" should be deleted;
Line 13, "claims 21 to 25," should read -- claim 21 or claim 22, --;
Line 18, "used" should read -- used; --;
Line 40, "20." should read -- 17. --;
Line 42, "any one of claims 21" should read -- claim 21 --;
Line 43, "to 28." should read -- or 22. --.

Signed and Sealed this

Twenty-seventh Day of May, 2003

JAMES E. ROGAN
*Director of the United States Patent and Trademark Office*